Patented Feb. 8, 1938

2,107,529

UNITED STATES PATENT OFFICE 2,107,529

MANUFACTURE AND USE OF MALT ADJUNCT FROM CORN

Walter R. Fetzer, St. Louis, Mo., assignor to Union Starch and Refining Company, Columbus, Ind., a corporation of Indiana No Drawing. Application November 25, 1935, Serial No. 51,485

2 Claims. (Cl. 99—50)

The present invention relates to beer brewing and to a product useful therein as an adjunct to malt.

There are "malt adjuncts" now in use which are essentially starch or hydrolytic products of starch. These are used as diluents of the malt to reduce the amount of soluble protein, and hence to reduce the protein haze derived from malt in finished beer, and also to lower the cost of materials for making beer. The malt adjunct provides fermentable substance without those associated substances provided by the malt. However, there are associated materials in the malt adjuncts which must be considered, and which are pertinent to the present invention. Malt adjuncts are usually not pure starches or sugars, but are impure forms of these materials. The pure substances are too costly for economic use.

The sugars as malt adjuncts are largely corn syrup or corn sugar. These have no bearing on the present invention. The starches commonly used are corn starches in the form of either coarse grits or refined grits, or other starches, such as rice grits. The present invention relates to a new form of corn grits which is neither the "coarse grits", nor the "refined grits" now known to the trade. Coarse grits is a product of a dry-milling process, which process is more or less standard for making hominy. Refined grits is a product of a wet-milling process, which process is more or less standard for making corn starch.

The character of corn and its industrial content is here set forth in order that operations thereon may be better understood. Corn kernels contain hull, germ and endosperm (starch) in about the following proportion by weight:

|  | Per cent |
|---|---|
| Hull | 4.3 |
| Germ | 11.0 |
| Endosperm | 84.7 |

There is protein variously distributed in the kernel in both soluble and insoluble form. The insoluble protein predominates, largely as gluten. In the kernel there is about 9% protein, the germ having about 2.1% and endosperm about 6.9%. The total soluble protein is about 1.4%, and the insoluble protein about 7.6%. About 75% of the soluble protein resides in the germ. Thus the endosperm contains by far the larger percent of insoluble protein and a smaller percent of the soluble protein.

The invention will be better understood by describing coarse grits and refined grits by reference to their production. They are products available in the standard dry or wet-milling of corn to produce corn starch and the attendant by-products. In the dry-milling process corn is conditioned to increase its moisture content from 15% to 20% or 25%, preferably by steam vapor. It is cracked to release the germ and break off the hull. Hull and germ are removed by suction. The endosperm contains fiber, gluten and starch, but mostly starch. This endosperm is then reduced in size by cracking, then screened to proper size. Grits so produced are dry-milled grits, and are the "coarse grits" above referred to. Two serious objections to them, compared to "refined grits" are a lower starch (the source of "extract'" reported in analysis) content, and a high corn oil content. Analyses of coarse grits may vary over a wide range. The following example is typical and is made on grits normally having or conditioned or calculated to have 12% moisture.

|  | Per cent |
|---|---|
| Moisture | 12.0 |
| Extract | 77.6 |
| Oil or fat | 1.1 |
| Protein | 10.4 |
| Fiber | .4 |
| Ash | .4 |

Coarse grits are desirable in brewing because of many reasons, such as low cost, less dust, and desirable distinctive flavor from the action of enzymes on the corn gluten. The protein in coarse grits is also acted upon by the proteolytic enzymes of the malt to produce nutritive proteins which create a stronger yeast strain for fermentation. Coarse grits are undesirable because of difficulties in cooking, making pressure cookers desirable, and because of a high corn oil content. Corn oil in the grits becomes rancid and this rancidity carries over into the finished beer, causing an undesirable type of bitterness or flavor, readily detected by experts. The corn oil creates a turbidity which is hard to remove and may cause a cloudiness in the beer. The presence of corn oil in the beer decreases its power to retain foam.

Coarse grits, being derived from kernels in a dry process, carry all the variations of corn as to age since harvest, as to botanical types, as to locality of growth, and as to seasonal differences. In particular, it is to be noted that corn in storage develops acidity. This cannot be removed in a dry-milling process, and hence it enters the beer-making process. All these factors make it impossible over a prolonged period for any miller to supply a standard or uniform type of coarse corn grits.

Furthermore, the corn gluten and the starch in coarse grits are still associated much in the same manner as in the original corn. This is such that the starch covers much of the gluten. In cooking coarse corn grits the gluten is covered or enveloped to a large extent by a protective coating of gelatinized starch. After the cooking, when malt is present, the malt enzymes act on the gelatinized grits. Proteolytic enzymes for the gluten become effective at lower temperatures than the saccharifying enzymes for the starch. Therefore, where the gluten is protected by starch the full effect of the proteolytic enzymes is not obtained, and unchanged gluten remains. This is filtered out and much of the value of the original gluten is lost.

Refined grits, on the other hand are produced by a wet-milling process and their character is such as to avoid disadvantages of the coarse grits. The wet-milling process may be accomplished by steeping corn to 45% moisture content in a water solution of .3% sulphurous acid. The highly moist corn is cracked to release the germ, and the product is combined with sufficient free starch suspension of adequate density to enable the germs to float and be drawn off. This is accomplished in tanks termed "separators". The remainder of the corn kernel, being heavier, settles to the bottom and is withdrawn to be finely ground as in a buhr mill. The effluent from the grinding mill is screened in a series of coarse reels, to remove the hull. The material going through the reels passes to similar reels covered with silk bolting cloth, or is variously treated to remove finer fibrous material. Gluten and starch go through the cloth and are run over tables where the gluten is floated off. The starch is resuspended and then dried. This is "refined grits" or the corn starch of commerce.

Refined grits may vary in analysis, and a typical example, calculated to an arbitrary moisture content, is as follows:

| | Percent |
|---|---|
| Moisture | 12.0 |
| Extract | 92.0 |
| Oil or fat | .1 |
| Protein | .5 |
| Fiber | .1 |
| Ash | .1 |

As a malt adjunct refined grits are advantageous in having a higher "extract", because of higher starch content, no danger from corn oil, little difficulty in cooking (because as a wet-processed material it separates easily into a fine suspension), and practically no corn gluten. It is disadvantageous in costing more, in being more dusty, and in lacking sufficient gluten. This lack of sufficient gluten is one cause of a weaker yeast strain, a cause of deficiencies in distinctive flavor, and a cause of lower "body" in the beer.

Accordingly, the present invention aims to provide a malt adjunct largely avoiding the undesirable properties of coarse grits and of refined grits, and combining the desirable qualities of both.

It is another object of the invention to produce a malt adjunct which may be cooked without difficulty, and without protecting the gluten, which provides protein in sufficient quantity to maintain a strong yeast strain, and to flavor beer, which has no corn oil, which is convenient to handle and which will remain in lumps of substantial size. Analysis for "oil or crude fat" in laboratory parlance, may show a small quantity, but this is distinct from corn oil. It is largely pigments and associated material soluble in the extraction solvents.

It is a further object of the invention to make beer with malt and corn grits of the new character herein described.

A still further object of the invention is to remove from a wet-milling process, at one or more of several possible places, corn grits, before they have reached a stage rendering them too low in corn gluten, but in such condition that the soluble protein obtained in the wet-milling process largely from the germ, can be removed by decantation or filtration or both, and then drying the removed grits to provide the new malt adjunct.

It is still another object to remove water soluble substance, particularly acids, ash and soluble protein, by the contact with water, and at the same time to disassociate the starch particles and the gluten particles from their more firm natural union, whereby to minimize the protective action of gelatinized starch as above referred to.

These and other objects and advantages of the invention will appear hereinafter.

In considering the standard wet-milling process it should be observed that the grits are subjected to attrition by all the actions performed. This gradually breaks the grits down into component starch grains, protein or gluten particles, and fine thread-like fibers. By withdrawing a product of this character, especially one containing the fibers, subsequent drying gives a product which can be kept in lumps with less dusting. Also because it has been broken down into small particles in the wet-milling, the lumps after drying again break up when wet, and the mass cooks as well and as easily as refined grits. The fiber in the dry mass, acts like hair in plaster. When lumps are wet, it acts like a wick to carry water into the lump, and it also acts to prevent the outside particles, when swelling or gelatinizing, from forming an enclosing envelope or barrier. Thus the fibers lead to early disintegration of lumps. In addition, the corn gluten is in a fine state of subdivision, and readily separable from the starch, so as to be available for action upon it by the proteolytic enzymes.

The product makes the corn milling process more economical than where refined grits are used. For instance: (1) the tabling operations to remove gluten are avoided. (2) In normally removing gluten from the starch which is to become refined grits, about 2 to 4 pounds of starch per bushel of corn remain with the gluten by reason of practical necessity. In the present invention by retaining the gluten in the product, the starch now lost by incomplete separation in the tabling process, is preserved and utilized in the beer-making process. (3) The separation of the germ containing the corn oil, is much more efficient in wet-milling than in dry-milling, and since in wet-milling, the germs are separated out before the new product is removed, there is no corn oil in the new product, and no loss in corn oil recovery,—all in contrast to dry-milling. Therefore, the new malt adjunct carries the economic savings of refined grits over coarse grits.

The new product may be withdrawn from the standard wet-milling process at many places, determinable by analysis of the product desired, ranging from a product including all of the fine fiber, all of the corn gluten, and all of the starch, which are present in the original corn, to a product containing no fiber and all of the corn gluten and starch, although preferably at places to include some fibrous material. However the process is carried out, it is possible to add fiber from the operations here described or from other operations, in order to increase the fiber content over that content which prevails at the point of removal, even to the point where the fiber content exceeds the natural content of the original corn. This makes it possible to produce a product of the character here described by fortifying defined grits with corn gluten, or fiber, or both, mixing well while wet, and drying to obtain the lumps which do not dust to excess. The fiber may be from sources other than corn. It is preferred that where fiber is added, the fiber is from a corn process, and since such fiber is available with adherent starch and gluten, which are now lost in producing refined grits, the binding substance is added usefully to the malt adjunct. Even the coarse hull with its adhering gluten or starch may be more finely fiberized by mechanical means, and added as a means to induce lump-formation on drying, with all the other advantages described for fiber. Suitable places for removal of starch are to be found at any stage between germ-removal and the point where the refined grits are removed from the tables.

The new product may easily be substituted by users of coarse grits, with the specific improvements that there is no corn oil, that it disintegrates well, cooks easily, gives distinctive flavor, creates stronger fermentation, and utilizes the gluten. For users of refined grits, a suitable new product may be withdrawn from the tables, when the tables are operated slower, to leave more gluten in the starch. By adding fiber to this material, it will be more like the coarse grits in having a lump form which is not so dusty as refined grits, or like the new product without fiber.

In the following table the letters A, B, C and D refer to products extracted at various points in the wet-milling process. Product A represents material removed just after germ-removal. Product B represents material removed after the first silk bolting. Product C represents material removed after still further grinding and bolting. Product D represents material removed just prior to tabling. These analyze as follows (figured on a common moisture basis):

|  | A | B | C | D |
|---|---|---|---|---|
|  | % | % | % | % |
| Moisture | 12.0 | 12.0 | 12.0 | 12.0 |
| Extract | 85.3 | 86.6 | 82.8 | 85.4 |
| Ether extract (not corn oil) | .4 | .4 | .7 | .5 |
| Insoluble protein | 5.5 | 6.3 | 7.5 | 6.4 |
| Fiber | .5 | .2 | .6 | .3 |

These show close agreement in composition.

The product of this invention, however it is produced, may therefore be described as one containing variable proportions of starch, corn gluten, with or without fiber, and substantially free from soluble protein, soluble ash, corn acids, and corn oil, all well mixed while wet, and dried. Fiber binds the lumps together and minimizes the tendency to dust. This product may be additionally improved, largely to reduce dusting to a lower degree, by adding corn sugar or syrup to the mass after the final squeezing to remove water. Syrup made from corn or other starch is preferred to sugar, because the syrup contains adhesive substance other than sugar, such as dextrine. The corn sugar or syrup may be mixed with the material in the form of filter-press-cake, or it may be dusted or sprayed onto lumps before drying, or even to dried lumps which may then be additionally dried. Corn sugar or syrup is merely exemplary of a suitable adhesive of which others are available, such as colloid starch, dextrine, gelatin or other types of sugar or syrups. It is not necessary in producing the product here described, that it be accomplished by removal from a milling process. The product may also be made by recombining starch, and gluten, with or with out fiber, however the latter is prepared. These materials may be combined in the presence of sufficient water, and with or without pressure, so as to produce lumps, and the lumps are then dried. Dry lumps containing adhesive, such as sugar, or adhesive producing substance, such as starch, may be wet as with steam or water, thereby to form wet adhesive on the outside, and then dried. Drying action under some conditions concentrates adhesive on the surface.

Of course, any of the products as above described may be diluted with wet starch which has been "tabled" in the usual manner, if it is desired to lessen the gluten content. Such mixture can be dried together, and the gluten with fine fiber will give it the desirable lump form.

Because of the characteristics of the dry-milling process, the coarse-grits as malt adjunct, contain corn oil, starch, water-soluble ash, water-soluble protein, corn acids, essentially all of the insoluble protein, and fiber. Because refined grits are prepared in water-processing they are substantially lacking in soluble protein and soluble ash, and substantially lacking in corn oil by reason of the efficient removal of germ. The fiber and insoluble protein are also substantially completely removed.

In both comparison and contrast, the new product contains substantially no corn oil, considerable fiber, substantially no soluble protein, substantially no soluble ash, substantially no corn acids, and all or large amounts of gluten. It can be more cheaply prepared or produced.

In using the new product for beer-making, considerable latitude is permitted. One desirable way of using a malt adjunct is to provide a beer with an extract, two-thirds of which is derived from the malt, and one-third of which is derived from the new product here described. For example 100 barrels of beer of 13% Balling original extract content, may require 3650 lbs. of malt of 64% extract yield, and 1360 lbs. of adjunct of 83% extract yield.

The adjunct and the malt combined are so treated as to hydrolyze the proteins and the carbohydrates with the aid of the proteolytic enzymes and diastase contained in the malt. These respectively change insoluble proteins to desirable soluble proteins and starches and sugars into dextrines. These enzymes of malt are most active between the temperatures of 38° C. and 48° C. (100° F. and 118° F. and 30° R. and 38° R.). The diastase is most active between 60° C. and 75° C. (140° F. and 167° F. and 48° R. and 60° R.). The diastase hydrolyzes and starches at temperatures of below 70° C. (158° F. and 56° R.) mainly into maltose, and above this temperature, mainly into dextrines. Maltose is a sugar which ferments into alcohol. Dextrines remain unfermented and furnish "body" to the beer. Therefore, it is seen that the temperature to which mash is subjected will control the character of the beer.

In using the new product as an adjunct the following method is merely illustrative and not in limitation of the process, as all brew-masters will appreciate.

The mash is divided into "cooker mash" and "main mash". The cooker mash contains the malt and all the adjunct. The cooker may be open or closed, and is provided with agitation and a steam inlet. For 100 barrels of wort (unfermented beer) there may be used 950 lbs. of malt, 1360 lbs. of the new adjunct here described, and 18 barrels of water. This is heated to 48° C. (113° F. and 36° R.) and peptonized for 30 minutes. Then it is heated with steam to 60° C. (140° F. and 48° R.) for 10 minutes to produce action of diastase. It is then gradually heated to 70° C. (158° F. and 56° R.) over a period of 10 minutes, and then raised to the boiling point. In boiling for 30 minutes all the starch is gelatinized or made colloidal and soluble.

At the same time, the main mash is made in a mashtun. This vessel has agitators, steam inlet and a false perforated bottom. 2700 lbs. of malt and 25 barrels of water are placed in the mashtun. The initial temperature is made 45° C. (113° F. and 36° R.) and held for 1 hour, for peptonization of the proteins. Then the hot cooked mash is added to the main mash. The combined mash attains a temperature of about 65° C. (147° F. and 52° R.) which is then increased to 68° C. (154° F. and 54° R.) for 10 minutes. This permits diastase to hydrolyze part of the starches into maltose. Then the temperature is raised to 72° C. (162° F. and 58° R.) for 10 minutes, then to 75° C. (167° F. and 60° R.) until all the starches are converted. This is the wort. After this preparation, the wort is run through the perforated bottom of the mashtun into a kettle where it is boiled with hops. The spent grains are "sparged" (washed out with hot water) until the desired volume of wort is produced for subsequent fermentation.

From the foregoing exemplary use of the new product in beer-making, it will be seen how the advantages are derived from the form and contents of the new product. In particular, the lump form with fibers minimizes dusting. The fibers hold the particles in lumps, act as wicks to introduce water to the interior of a lump, and act as partitions to help break up lumps in wetting. In this partitioning function the flatness of fiber, as from shredded hulls, is very beneficial in making a wide area for cleavage. The gluten and the starch are in physical association, but easily separable when wet, so that the gluten and the starch can exist independently in suspension when a lump is broken up in water. Thus, in the cooking the gluten is not exposed to the possibility of being covered by starch, so that later, the gluten is available for action of the proteolytic enzymes which act upon the protein before the starch is saccharified by the diastase.

Numerous additional variations of the product and process are contemplated as falling within the scope of the invention as defined by the appended claims.

Matter disclosed and unclaimed herein is further described and claimed in my copending application Serial No. 87,950, filed June 29, 1936.

I claim:

1. A malt adjunct consisting essentially of unbroken starch grains, from 5% to 10% of corn gluten and more than 1% of corn kernel fiber, and substantially free from water soluble ash, water soluble protein, corn acids and corn oil, the starch being largely present as free grains dispersible in cold water and also as grains retained in association with fiber and gluten, the gluten being both free and adherent to fiber, the said ingredients being united into dry lump form dispersible in cold water, the gluten and the fiber serving as binding agents to minimize formation of dust from the lumps.

2. The method of making a malt adjunct which comprises treating corn kernels to elevate the moisture content, cracking the kernels to release the germ, floating away the germ, grinding the residual kernel, treating the product with water to remove soluble ash, soluble protein and corn acids, and to release free starch grains, combining free starch grains, corn kernel fiber and gluten in water, dewatering the mixture to form wet lumps, and drying the lumps, the gluten and fiber serving as binding agent to minimize formation of dust from the dry lumps.

WALTER R. FETZER.